March 3, 1970     R. A. SANDERSON     3,498,844
FUEL CELL WASTE HEAT AND WATER REMOVAL SYSTEM
Filed Aug. 21, 1967
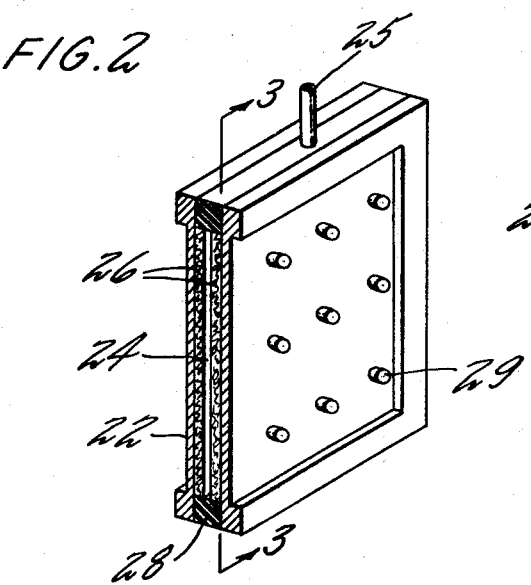
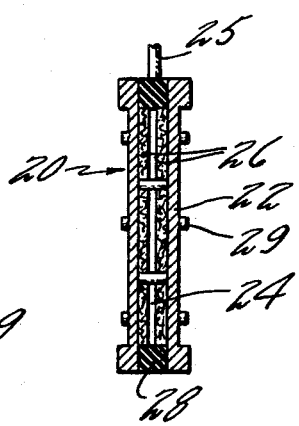
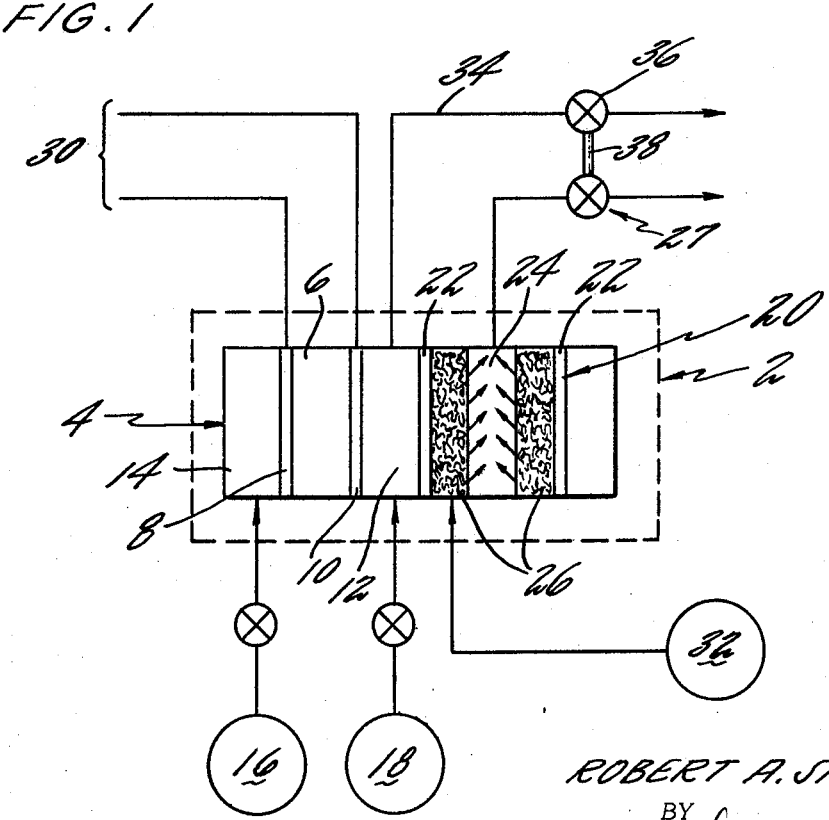
INVENTOR.
ROBERT A. SANDERSON
BY Charles A. Warren
ATTORNEY United States Patent Office 3,498,844
Patented Mar. 3, 1970

3,498,844
FUEL CELL WASTE HEAT AND WATER REMOVAL SYSTEM
Robert A. Sanderson, Thompsonville, Conn., assignor to United Aircraft Corporation, East Hartford, Conn., a corporation of Delaware
Filed Aug. 21, 1967, Ser. No. 661,925
Int. Cl. H01m 27/12
U.S. Cl. 136—86                                  4 Claims

ABSTRACT OF THE DISCLOSURE

A waste heat removal system for a high power density fuel cell wherein the waste heat is removed from the fuel cell with substantially no ancillary equipment, the weight of the system thereby being minimized.

BACKGROUND OF THE INVENTION

This invention relates to a waste heat removal system for a fuel cell.

In a fuel cell, the heat generated in the cell stack must be either rejected or absorbed by the stack with a resultant temperature rise in the cell stack. For simplicity, during short missions it is highly desirable to contain the waste heat within the cell stack. Therefore, in the case of continuous pulsing operation or steady operation at high-power density, some maximum allowable stack temperature rise and stack heat capacity will impose a limiting total energy output. Hence, to increase the level of energy output during steady operations or continuous pulsing operation means must be provided to accommodate any accompanying stack temperature rise.

In the fuel cell systems designed for longer missions which operate at high energy output levels, a heat removal subsystem is generally provided. In conventional fuel cells and those described by the prior art, waste heat removal is accomplished by temperature rise of a gas or liquid coolant. Most systems using this type cooling include either a pump or fan, a heat exchanger and controls for maintaining the proper heat rejection rate.

The present invention is directed at a fuel cell waste heat removal system which is adaptable to short mission operation at high-power densities and longer mission operation at high energy output levels. In addition, the construction disclosed herein removes waste heat without any external components, such as a pump, heat exchanger or control, thereby providing a fuel cell system with an optimum weight. The present invention thereby provides a system which is essentially independent of the external environment for rejecting excess heat.

SUMMARY OF THE INVENTION

It is a primary object of this invention to provide a waste heat removal system for a pulse power fuel cell which is of an optimum weight construction.

In a fuel cell, energy density is maximized by minimizing total power supply weight, the total of both hardware weight and reactants for a given task. The relative weights of the subsystems are determined by the fuel cell performance characteristics and choice of operating power density. It has been found that as cell power density increases, that is, as increased power is drawn from each unit of electrode area, cell efficiency decreases. Also, increasing power density reduces stack weight but lowers cell efficiency and lower cell efficiency increases reactant system weight. Increased reactant consumption also results in increased water generation rates and waste heat production with an increase in the weight of these subsystems. It should, therefore, be clear that for any fuel cell application there is a specific regime of power density which results in an optimized cell weight.

The present invention provides a waste heat removal system which is optimized from a weight standpoint by eliminating substantially all ancillary equipment; and which, since a higher cell stack temperature rise is allowable, permits higher energy output from the fuel cell. The present invention accomplishes this by removing waste heat by utilizing a wick-type evaporator. The evaporator consists of separator plates positioned internal of the cell and between adjacent cells. Attached to the hollow side of each of the separator or collector plates is a hydrophilic material, either metallic or nonmetallic. Liquid, which is stored in a reservoir external of the fuel cell, is supplied to the hydrophilic material. Since the separator plates are in heat transfer relationship to the cell electrode, waste heat is therefore transferred to the liquid in the hydrophilic material. This energy transport increases the temperature of the liquid and thus the vapor pressure. This vapor pressure is regulated by a pressure valve, the valve venting the vapor pressure when it exceeds a predetermined level. It should therefore be clear that by regulating the pressure of the exhausted water vapor that the fuel cell temperature can be regulated and that the fuel cell can be operated at higher energy output levels.

BRIEF DESCRIPTION OF THE DRAWINGS

FIGURE 1 is a schematic of a fuel cell system showing the device of the invention.

FIGURE 2 is a sectional view of a wick evaporator showing the device of the invention.

FIGURE 3 is a view substantially along line 3—3 of FIGURE 2 showing the overall system concept.

DESCRIPTION OF THE PREFERRED EMBODIMENT

Referring first to FIGURE 1 for a description of an illustrated embodiment of the invention, fuel cell module 2 includes a plurality of fuel cells 4 arranged in stacked relation. For the purpose of this application, fuel cell 4 is made up of an electrolyte matrix 6 with electrodes 8 and 10 on opposite sides thereof and in contact therewith. Fuel chamber 12 is provided adjacent electrode 10 and oxidant chamber 14 is provided adjacent electrode 8. Fuel and oxidant gas is supplied from external reactant tanks 16 and 18, respectively. With this type of cell the electrolyte is preferably a base; for example, an aqueous solution of potassium hydroxide and the electrodes may be a nickel oxide sinter which is catalyzed or a catalyzed screen. The fuel is preferably relatively pure hydrogen and the oxidant is relatively pure oxygen.

Referring now to FIGURES 1, 2 and 3, wick evaporator 20 is illustrated. As shown, wick evaporator 20 comprises two spaced collector or separator plates 22, collector plates 22 forming a hollow cooling chamber 24 therebetween. Bonded to or mechanically attached to the hollow side of collector plates 22 is hydrophilic material 26. It is pointed out that this hydrophilic material may be either metallic or nonmetallic. Enclosing the periphery of cooling chamber 24 is seal or gasket 28, cooling chamber 24 being vented by vent 25. Vent 25, at one end is in communication with cooling chamber 24 and with pressure regulating valve 27 at its other end. The position of collector plates 22 within the fuel cell is extremely important, it being required that they be in heat transfer relationship with electrodes 8 and 10, respectively. Towards this end, collector plates 22 are provided with a plurality of reactor plate pins 29 which are in substantially abutting relationship with electrodes 8 and 10. An example of this type construction is described in the copending Sanderson application entitled "Fuel Cell System," Ser. No. 617,982 and having the same assignee as this application.

In operation, when a load is placed across power leads 30, any excess heat from the electrodes is conducted through pins 29 to the surface of plates 22. Previously, a liquid has been supplied from an external reservoir 32 to the hydrophilic material 26 and the heat which has been supplied to plate 22 causes the temperature of this liquid to rise. As the temperature of the liquid rises so does the vapor pressure of the liquid and that in the cooling chamber. This pressure will continue to rise until it is high enough to open pressure regulating valve 27, the water vapor to be exhausted passing from chamber 24, through vent 25 and regulating valve 27. Pressure regulating valve 27 is scheduled such that considering the heat flux per unit area and the heat transfer resistances from the electrode to the cooling chamber, the temperature level of the electrodes is within the desired temperature limit. It should be clear that the pressure regulating valve regulates the temperature of the fuel cell or the rise in temperature therein by controlling the vapor pressure of the exhausted water vapor.

The system as shown in FIGURE 1 provides for the removal of water from cell stack 4 by venting hydrogen through vent 34. Vent 34 is in contact with chamber 12 at one end and with pressure regulating valve 36 its other end. Removing water from a cell stack by venting hydrogen has been previously described in the prior art and is in no part of the invention claimed herein; however, the present embodiment provides a means of connecting the water removal and heat removal systems together and has one system operate as a function of the other system. This is accomplished by providing coupling means 38, herein illustrated as a pipe, between regulating valve 27 and regulating valve 36. The hydrogen vent valve 36 is coupled to regulator valve 27 such that as valve 27 opens, valve 36 is also caused to open. The mechanical opening and closing of these valves may be accomplished by means well known in the art of pressure responsive valves. However, the point at which valve 27 actuates valve 36 is determined by a prescribed relationship of heat and water removal. This relationship is determined by the fuel cell system and how much excess heat and water is to be removed.

It is to be understood that the invention is not limited to the specific embodiments herein illustrated and described but may be used in other ways without departure from its spirit as defined by the following claims.

What is claimed is:

1. The method of removing heat and water from a fuel cell system comprising the steps of:
    positioning a hydrophilic material internal of the fuel cell in heat transfer relationship with the cell electrodes;
    supplying a liquid from an external source to the hydrophilic material;
    controlling the pressure of the liquid in the hydrophilic material by means of a first valve means and hence the temperature at which the liquid will vaporize;
    vaporizing the liquid in the hydrophilic material by the addition of the excess cell heat from the cell electrodes;
    venting the vapor when the vapor pressure exceeds a predetermined setting of the valve;
    operably controlling a second valve means as a function of the vapor pressure controlled by the first valve means; and
    removing water from the fuel cell through the second valve means on a predetermined signal from the first valve means.

2. A heat removal and water removal system in combination with a fuel cell including electrodes and a fuel supply chamber, comprising:
    a hydrophilic material positioned internally of the fuel cell, said hydrophilic material being in heat transfer relationship with the fuel cell electrodes;
    an external liquid reservoir for supplying liquid to the hydrophilic material;
    valve means for controlling the pressure of the liquid within the hydrophilic material so that when excess cell heat is transferred from the fuel cell electrodes to the liquid in the hydrophilic material, the liquid therein will vaporize;
    means for venting the vapor so formed; and
    a second valve means in communication with said first valve means, said second valve means being connected to a fuel supply chamber and thereby providing a vent for product water, the second valve being operable in response to a signal from the first valve, the signal being based on a predetermined relationship of heat and water removal from the cell.

3. A heat removal and water removal system as in claim 2 in combination with a plurality of fuel cells wherein;
    a collector plate is located at each end of each cell, adjacent collector plates being axially spaced and forming a cooling chamber therebetween;
    the hydrophilic material attached to the chamber side of each collector plate, the chamber hence being substantially lined with the hydrophilic material; and
    the first valve means controls the pressure of the liquid within the hydrophilic material and the passage so that when excess cell heat is transferred through the collector plate to the liquid in the hydrophilic material, the liquid will vaporize as a function of the pressure as determined by said valve.

4. A construction as in claim 3 wherein:
    a heat transfer relationship between the collector plates and the electrodes is provided by a plurality of pins extending from the collector plates to substantially abutting relationship with the electrodes.

References Cited

UNITED STATES PATENTS

| | | | |
|---|---|---|---|
| 3,455,743 | 8/1969 | Huebscher et al. | 136—86 |
| 3,112,229 | 11/1963 | Bacon et al. | 136—86 |
| 3,370,984 | 2/1968 | Platner | 136—86 |
| 3,392,058 | 7/1968 | Harrison et al. | 136—86 |

FOREIGN PATENTS

| | | |
|---|---|---|
| 760,512 | 6/1967 | Canada. |

ALLEN B. CURTIS, Primary Examiner

M. J. ANDREWS, Assistant Examiner